US008687609B2

(12) United States Patent  (10) Patent No.: US 8,687,609 B2
Gundavelli et al.  (45) Date of Patent: Apr. 1, 2014

(54) MANAGING ROUTER ADVERTISEMENT MESSAGES TO SUPPORT ROAMING OF WIRELESS MOBILE CLIENT DEVICES

(75) Inventors: Srinath Gundavelli, San Jose, CA (US); Abhijit Choudhury, Cupertino, CA (US); Rohit Suri, Fremont, CA (US); Venkatesh Kanagasabapathy, San Jose, CA (US); Bhavannarayana Nelakanti, Sunnyvale, CA (US); Sudhir Jain, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 735 days.

(21) Appl. No.: 12/612,116

(22) Filed: Nov. 4, 2009

(65) Prior Publication Data

US 2011/0103284 A1 May 5, 2011

(51) Int. Cl.
*H04W 4/00* (2009.01)
(52) U.S. Cl.
USPC ........... 370/338; 370/331; 370/389; 370/401; 370/432
(58) Field of Classification Search
USPC .......... 370/328, 329, 331, 338, 400, 401, 432
See application file for complete search history.

(56) References Cited

U.S. PATENT DOCUMENTS

| 5,758,281 | A | 5/1998 | Emery et al. |
|---|---|---|---|
| 6,490,259 | B1 | 12/2002 | Agrawal et al. |
| 6,654,359 | B1 | 11/2003 | La Porta et al. |
| 6,961,774 | B1 | 11/2005 | Shannon et al. |
| 6,970,459 | B1 | 11/2005 | Meier |
| 7,061,896 | B2 | 6/2006 | Jabbari et al. |
| 7,596,376 | B2 | 9/2009 | Calhoun et al. |
| 7,639,648 | B2 | 12/2009 | Nagarajan et al. |
| 2002/0085719 | A1 | 7/2002 | Crosbie |
| 2004/0221042 | A1* | 11/2004 | Meier ........................... 709/227 |
| 2004/0252653 | A1 | 12/2004 | Shimizu et al. |
| 2005/0036471 | A1 | 2/2005 | Singh et al. |
| 2005/0165953 | A1 | 7/2005 | Oba et al. |
| 2006/0187878 | A1 | 8/2006 | Calhoun et al. |
| 2006/0240825 | A1 | 10/2006 | Funabiki et al. |

(Continued)

FOREIGN PATENT DOCUMENTS

WO 2010053624 A1 5/2010

OTHER PUBLICATIONS

Johnson et al., "Mobility Support in IPv6", Network Working Group, The Internet Society; Jun. 2004, RFC 3775, pp. 1-143.

(Continued)

*Primary Examiner* — Christopher Grey
(74) *Attorney, Agent, or Firm* — Edell, Shapiro & Finnan, LLC

(57) ABSTRACT

Techniques are provided to manage how router advertisement messages are forwarded for ultimate wireless transmission in a wireless network. In one embodiment, a multicast router advertisement message intended for a virtual local area network is converted into individual unicast router advertisement messages directed to specific wireless mobile client devices that are part of that virtual local area network. In another embodiment, router advertisement messages are routed between controllers according to the current location of a wireless mobile client device. In still other embodiments, techniques are provided to minimize the volume of the router advertisement messages sent over a wireless network, and to proactively send a unicast router advertisement message to a mobile client device that has performed a handoff, without waiting for a router solicitation message.

17 Claims, 10 Drawing Sheets

(56) References Cited

U.S. PATENT DOCUMENTS

| | | |
|---|---|---|
| 2006/0245393 A1 | 11/2006 | Bajic |
| 2006/0245404 A1 | 11/2006 | Bajic |
| 2007/0070959 A1 | 3/2007 | Almeroth et al. |
| 2007/0140163 A1 | 6/2007 | Meier et al. |
| 2007/0147300 A1 | 6/2007 | Jee et al. |
| 2007/0160008 A1 | 7/2007 | Burgess |
| 2007/0160017 A1 | 7/2007 | Meier et al. |
| 2008/0002607 A1 | 1/2008 | Nagarajan et al. |
| 2008/0002642 A1 | 1/2008 | Borkar et al. |
| 2008/0043665 A1 | 2/2008 | Jeon et al. |
| 2008/0107070 A1 | 5/2008 | Sastry |
| 2008/0130598 A1 | 6/2008 | Kalhan |
| 2008/0175201 A1 | 7/2008 | Ahmavaara et al. |
| 2009/0059924 A1 | 3/2009 | Muramoto et al. |
| 2009/0093232 A1 | 4/2009 | Gupta et al. |
| 2009/0161590 A1 | 6/2009 | Lewis et al. |
| 2010/0040056 A1* | 2/2010 | Kobayashi ............... 370/390 |
| 2010/0172293 A1 | 7/2010 | Toth et al. |
| 2010/0232306 A1 | 9/2010 | Jeon et al. |
| 2010/0290398 A1 | 11/2010 | Choudhary et al. |
| 2011/0122804 A1* | 5/2011 | Iyer et al. ............... 370/311 |

OTHER PUBLICATIONS

Narten et al., "Neighbor Discovery for IP Version 6 (IPv6)", Network Working Group, RFC 4861, Sep. 2007, pp. 1-84.

International Search Report and Written Opinion dated Dec. 7, 2010 cited in Appication No. PCT/US2010/051249.

Prommak C., et al., "Next Generation Wireless LAN System Design," Military Communications Conference, MILCOM 2002, Proceedings, Anaheim, CA, Oct. 7-10, 2002, NY NY, US vol. 1, Oct. 7, 2002, pp. 473-477.

* cited by examiner

190

US 8,687,609 B2

MANAGING ROUTER ADVERTISEMENT MESSAGES TO SUPPORT ROAMING OF WIRELESS MOBILE CLIENT DEVICES

TECHNICAL FIELD

The present disclosure relates to message routing in a network environment where wireless mobile client devices may roam from one wireless local area network access point device to another wireless local area network access point device.

BACKGROUND

Internet Protocol version 6 (IPv6) is the next-generation internetworking protocol version designated as the successor to IPv4. IPv4 is the first implementation used in the Internet and is still widely used. These protocols are used as an Internet Layer protocol for packet-switched internetworks.

IPv6 has a vastly larger address space than IPv4. This results from the use of a 128-bit address, whereas IPv4 uses only 32 bits. This expansion provides flexibility in allocating addresses and routing traffic and eliminates the primary need for network address translation (NAT), which gained widespread deployment as an effort to alleviate IPv4 address exhaustion.

IPv6 provides for a so-called stateless auto-configuration function. The stateless auto-configuration function allows an IPv6 host to auto-generate an IPv6 address based on the subnet information present in router advertisement messages received from the IPv6 routers on the link. These router advertisement messages are periodically multicasted from the router. In order to support IPv6 mobility for mobile nodes (e.g., wireless client devices) in a mobility domain, the network has to ensure a mobile node that has roamed away from its home link, also called its home virtual local area network (VLAN), can receive router advertisement messages sent on its home VLAN, wherever the mobile currently operating. Simply forwarding all the router advertisement messages from the home router to each and every host will result in numerous router advertisement messages being sent over multiple wireless links, placing a burden on the throughput of the wireless links. In addition, some router advertisement messages may need to be suppressed in order to prevent the wireless mobile client device from generating a new IPv6 address and terminating a session.

DESCRIPTION OF EXAMPLE EMBODIMENTS

Overview

Several techniques are described herein to manage how router advertisement messages are forwarded to ultimate wireless transmission in a wireless network. Some of these techniques may be performed in equipment that is configured to make the wireless transmission in a wireless network or in control equipment that serves as a gateway between a wired network and the wireless network.

Currently, there are no known techniques for extending IPv6 mobility support to wireless local area networks (WLANs). Mobile IPv6 [RFC-3775] specifies IPv6 mobility global mobility support, but the scope is for the movement in the global Internet and it requires a Mobile IPv6 client stack on the mobile node. Techniques are provided herein for extending micro-mobility support to enterprise layer-2 switch environments and with no mobile IP stack support on the mobile node and where WLAN links which have shared link scope. An example of a WLAN link technology is one that employs the IEEE 802.11 standards, but this is by way of example only, and not intended to be limiting. The techniques described herein are applicable to other over-the-air wireless communication protocols and technologies where wireless base station or gateway devices serve wireless client devices in a wireless network and also connect to a wired network.

The techniques described herein allow an IPv6 wireless mobile client device to be part of an enterprise virtual local area network (VLAN) with an associated IPv6 prefix set and to change its point of attachment to a different wireless access point and still detecting no change in its network configuration. Router advertisement messages sent on a given IPv6 VLAN are delivered to only those IPv6 wireless mobile client devices (also referred to herein as "mobile nodes") that are part of that VLAN. On a fixed network, this involves sending the router advertisement message by including the corresponding IPv6 prefix and sending it to an ALL-NODES multicast address (FF02::1). However, the same approach cannot be adopted in a mobile network environment because all the associated IPv6 nodes on a given access point may not be part of the same VLAN. Some of these nodes may be local nodes and some other nodes may be roaming nodes that are part of some other VLAN. If all the attached nodes receive the router advertisement messages that advertise the local IPv6 prefix, mobile nodes will use the local IPv6 prefix to generate IPv6 addresses and hence lose existing sessions. To avoid this issue, prefix segregation on a VLAN basis is employed as described herein. In one embodiment, all the router advertisement messages carrying any prefix information options are sent as unicast message to each IPv6 mobile node on an individual basis. Each of the mobile nodes should receive only those router advertisement messages that are sent to their respective VLAN. Other embodiments are described herein to provide special handling of router advertisement messages.

Example Embodiments

Figure 1:
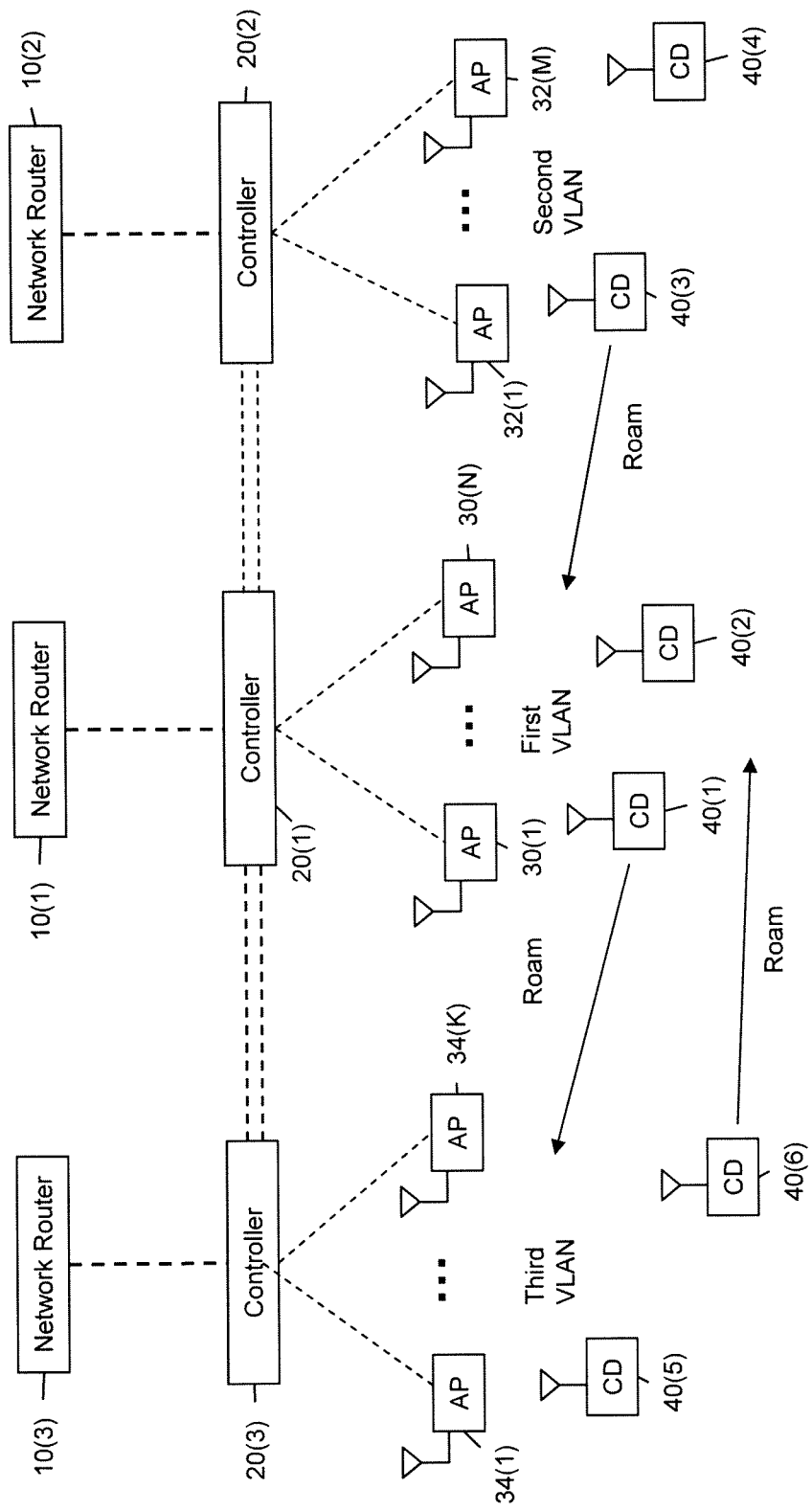
FIG. 1 is a block diagram of a communication network environment in which wireless mobile client devices may roam from one wireless access point to another and in which router advertisement messages are to be managed according to techniques described herein.

Reference is first made to FIG. 1 that shows a block diagram of a networking environment to which the techniques described herein are applicable. The configuration shown in FIG. 1 generally depicts a configuration that is common in bridging a wired network with a wireless network. There is a first network router 10(1) on a first virtual local area network (VLAN), where a VLAN is defined as logically a different IPv6 subnet. The first network router 10(1) communicates with a first controller 20(1). The first network router 10(1) communicates, via a control and provisioning of wireless access point (CAPWAP) tunnel or other layer2/layer3 tunnel, with a first controller 20(1). The first controller 20(1) is also referred to herein as a "Home" controller with respect to certain devices for reasons that will become apparent hereinafter. The first controller 20(1) communicates with and controls a plurality of wireless LAN (WLAN) access points (APs) 30(1)-30(N) via CAPWAP or other Layer2/Layer3 tunnels. The first controller 20(1) serves as a bridge between the wired network of which the network router 10(1) is a part and the wireless network served by the APs 30(1)-30(N). The APs 30(1)-30(N) provide wireless connectivity with wireless client devices (CDs), an example of which are shown at reference numerals 40(1) and 40(2).

Similarly, there is a network router 10(2) that communicates with a second controller 20(2) that is associated with a second VLAN. The second controller 20(2) communicates with and controls APs 32(1)-32(M), and these APs provide wireless connectivity with CDs 40(3) and 40(4), for example. Likewise, there is a network router 10(3) that communicates with a third controller 20(3). The third controller 20(3) communicates with and controls APs 33(1)-33(K), and these APs provide wireless connectivity with CDs 40(5) and 40(6), for example.

The first controller 20(1) controls the APs 30(1)-30(N) which serve CDs that belong to a particular subnet and thus may be said to belong to a first VLAN insofar as they are associated with a unique IPv6 subnet served by network router 10(1). Likewise, the second controller 20(2) controls the APs 32(1)-32(M) which serve CDs that belong to a second subnet and thus belong to a second VLAN served by network router 10(2). The same can be said with respect to the third controller 20(3) that controls the APs 33(1)-33(K) which serve CDs that belong to a third subnet or third VLAN served by network router 10(3). The controllers 20(1)-20(3) are, for example, wireless LAN controller devices that are configured to provide a management point for a group of APs, and to route traffic between the wired and wireless networks. An AP may be said to host a VLAN in that it serves CDs that belong to that VLAN. Multiple APs under control of the same controller may host the same VLAN in that those multiple APs may serve CDs in the same VLAN. When a CD roams from one AP to another AP, the CD may attach to an AP that is not responsible for hosting that CD's VLAN.

There is a CAPWAP or other layer-2/layer-3 tunnel set up between a controller and every AP under its control. This is shown in the dotted lines drawn between controller 20(1) and APs 30(1)-30(N), for example. There is also a CAPWAP or other layer-2/layer-3 tunnel set up between each controller and every other controller. This is shown by the double dotted lines between controllers 20(1)-20(3). The dotted line between each router and its corresponding controller is meant to indicate that these two devices are not necessary directly connected to each other; there may be intervening device.

There may be network switches between the APs and the controller for a given WLAN. It is to be further understood that the configuration shown in FIG. 1 is a very simple configuration and that there are, in practice, many more controllers and VLANs in any given network environment. Furthermore, the term "AP" or wireless access point device is meant to refer to any wireless device that provides wireless connectivity in a wireless network, and is not to be limited to, for example, IEEE 802.11 APs. For example the techniques described herein are applicable to other wireless networks, such as a WiMAX™ wireless network, where devices known as base stations in WiMAX parlance perform functions similar to that of an AP in an IEEE 802.11 wireless network. Likewise, the term "controller" or "WLAN controller" is meant to refer to any control element that controls a wireless device that provides wireless connectivity in wireless network, and includes for example, a wireless gateway device. A WiMAX wireless network is only one example of other wireless networks to which these techniques are applicable. Thus, the configuration shown in FIG. 1 is only meant to be an example for purposes of describing the techniques herein.

The CDs shown in FIG. 1 may be mobile and thus move between coverage areas of APs. Each VLAN has different IPv6 subnet/prefix. When a CD first attaches (or in WLAN parlance "associates") with any of the wireless APs controlled by one of the controllers 20(1)-20(3), the CD will be made part of that VLAN (IPv6 subnet) which that AP or an associated switch is configured to serve. The CD then is said to belong to or is a part of that VLAN. As part of creating this association between the CD and the VLAN, unique IPv6 addresses are assigned to the CD using the aggregate prefix block (subnet block) allocated to the VLAN. When the CD's state is removed, these addresses are released and recycled.

An IPv6 node address is a 128-bit record represented as eight fields of up to four hexadecimal digits. A colon separates each field. An example of an IPv6 address is 3ffe:ffff: 101::230:6eff:fe04:d9ff. The symbol "::" is special syntax that is used as a shorthand way of representing multiple 16-bit groups of contiguous zeros. To indicate a subnetwork (subnet) address, the IPv6 standard uses subnet prefixes similar to the IPv6 format. An IPv6 node address and its subnet prefix length can be represented as: <IPv6-Node-Address>/<Prefix-Length>, where <IPv6-Node-Address> is an IPv6 address and <Prefix-Length> is a decimal value specifying how many of the leftmost contiguous bits of the IPv6 address make up the subnet prefix. Each VLAN is assigned or associated with an aggregated IPv6 prefix block.

Assuming for the sake of an example that CDs 40(1) and 40(2) first enter the mobility or wireless network domain at one of the APs 30(1)-30(N), then these CDs are assigned an IPv6 address with a subnet prefix that corresponds to a subnet prefix assigned to the network router 10(1). Specifically, the controller 20(1) allocates an IPv6 subnet prefix of network router 10(1) as the network prefix for CDs 40(1) and 40(2). The controller at which the CD initially enters the mobility domain stores entry information for that CD comprising a media access control (MAC) address for the CD, assigned IPv6 home network prefix and home controller ID (e.g., ID for controller 20(1)). Thus, the VLAN for CDs 40(1) and 40(2) is the first VLAN under control of the controller 20(1) and corresponding to network router 10(1). Once this initial VLAN assignment is made, the CDs 40(1) and 40(2) will always be part of the first VLAN and all other controllers (and APs) will store data indicating that association. A CD can obtain one or more IPv6 network addresses from the prefix corresponding to its initial VLAN it discovers when entering the mobility domain, and can retain those addresses even after moving anywhere within the mobility domain. Consequently, with respect to CDs 40(1) and 40(2), the second controller 20(2) and third controller 20(3) are referred to as "foreign" controllers because they control APs that are configured to serve CDs in other VLANs.

The controllers 20(1)-20(3), via the aforementioned CAP-WAP or other layer-2/layer-3 tunnels communicate with each other in order to share information as to the VLAN of each CD that has entered the mobility domain in the network. In addition, through these same tunnels, when a CD roams from a first AP to a second AP that is controlled by a different controller, the controller for the second AP to which it roamed shares information with the controller for the first AP. In this way, at any given time, controller 20(1) stores "mobility data" that comprises information identifying all other controllers that controls APs to which at least one CD has roamed from. The same applies to controller 20(2) for all CDs that belong to the second VLAN and to controller 20(3) for all CDs that are part of the third VLAN. Moreover, each controller 20(1)-20(3) stores information identifying each of the one or more APs that it controls.

As an example, the IPv6 mobility state for a CD may comprise the following information.

Link-layer Address: 00-18-DE-97-C2-51
IPv6 Home Network Prefix: CAFE::/128
IPv6 Link-local Address: FE80::218:deff:fe97:c250
IPv6 Global Address (1): CAFE::deff:fe97:c250/128
IPv6 Global Address (2): CAFE::1/128
IPv6 Global Address (3): CAFE::2/128
Home VLAN: eng-net
Home Controller: 174.14.1.2
Foreign Controller (Current Anchor): 174.14.11.1
IPv4 Mobility State: <CURRENT STATE>

The IPv6 protocol (and its predecessor versions) defines a mechanism whereby a device can discover a network router. In IP, this process is called router discovery. The messages involved in router discovery are a Router Advertisement (RA) message and a Router Solicitation (RS) message.

Network routers send RA messages. RA messages inform listening devices that the router exists, and provide important information about the router such as its address (or addresses, if it has more than one) and how long the host should retain information about the router. Routine RA messages are sent on a regular basis to a general audience, that is, as a so-called multicast address message, with the time between messages being administrator-configurable (for example, between 7 and 10 minutes). A device listens for RA messages, and when received, processes it and adds the information about the router to its routing table.

RA messages contain IPv6 prefixes/subnet information (first 64 bits), allowing a CD to generate the last 64 bits and generate a complete 128-bit address. An IPv6 router sends RA messages periodically at a frequency based on configuration parameters. When RA messages have to be directed over a wireless link, the number and frequency of RA messages can impose a burden on the performance of the wireless network, and in particular have an impact on the traffic capacity. A CD sends RS messages to discover IPv6 routers/subnets on the link. An IPv6 router sends an RA message in response to a solicitation request carried in an RS message. The response is usually unicast, but in some cases can be a multicast (all nodes response), which again can become disruptive when such a message is issued every time a CD roams from one AP controlled by one controller to another AP controlled by another controller.

In a network environment such as that shown in FIG. 1, CDs may roam from one AP to another AP. When a CD roams to an AP that is under control of a controller different from the controller of the AP to which it was previously attached, the CD still needs to receive RA message for its VLAN, but not receive RA messages sent on other VLANs. This is particularly important when the RA messages need to be sent over a wireless link to a CD because it is generally desirable to minimize wireless transmissions when at all possible in order to leave the wireless channel available to carry real traffic or data. In addition, the RA messages should be routed in such a way as to ensure the CD "believes" it is still part of its VLAN and so it can continue to use the IPv6 addresses generated for that VLAN. For this reason, the RA messages from the CD's VLAN need to be forwarded to the CD wherever it is currently attached, thereby providing mobility for the IPv6 address.

To this end, each controller 20(1)-20(3) shown in FIG. 1, and in some cases, each AP, is configured with RA message control process logic that manages how RA messages are handled.

Figure 2:
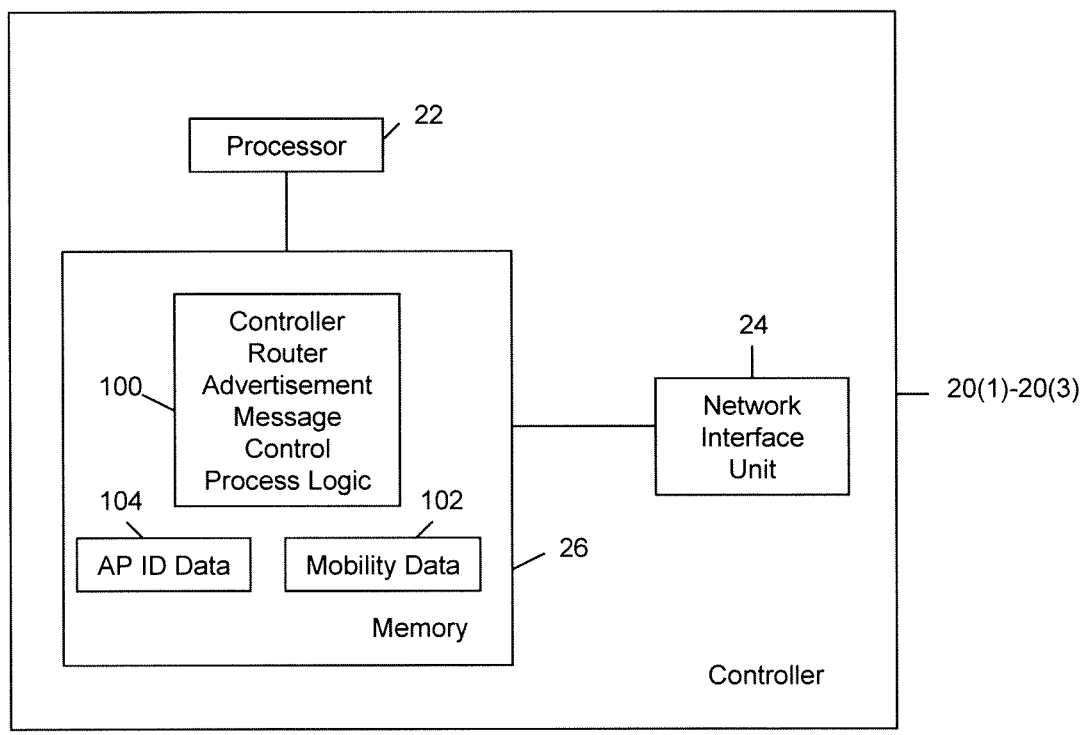
FIG. 2 is a block diagram for a controller that is configured to perform various router advertisement message routing control techniques.

Referring now to FIG. 2, a block diagram is shown that is meant to represent an example of a block diagram for the controllers 20(1)-20(3), which are configured to perform the RA message routing management techniques described herein. There is a processor 22, a network interface unit 24 and a memory 26. The processor 22 is for example, a microprocessor, a microcontroller, a digital signal processor, etc. The network interface unit 24 is a device that is configured to enable communications over a wired network according to any of a variety of networking protocols.

The memory 26 is a tangible processor readable or computer readable memory that stores or encoded with instructions that, when executed by the processor 22, cause the processor 22 to perform functions described herein. For example, the memory 26 is encoded with instructions for router advertisement message control process logic 100. The process logic 100 is described hereinafter in connection with FIGS. 4, 6, 7, 9, 10 and 11.

While FIG. 2 shows a processing environment comprising a data processor 22 that executes software stored in memory 24, an alternative processing environment is a fixed data processing element, such as an application specific integrated circuit (ASIC) that is configured, through fixed hardware logic, to perform the functions of the logic 100. Yet another possible data processing environment is one involving one or more field programmable logic devices, or a combination of fixed processing elements and programmable logic devices.

The memory 26 also stores the aforementioned mobility data shown at reference numeral 102. Again, the mobility data comprises data concerning the home VLAN for CDs, current points of attachment of CDs (i.e., IDs for foreign controllers where a CD is currently attached). In addition, the memory 26 also stores AP IDs shown at 104 for all APs under its control.

Figure 3:
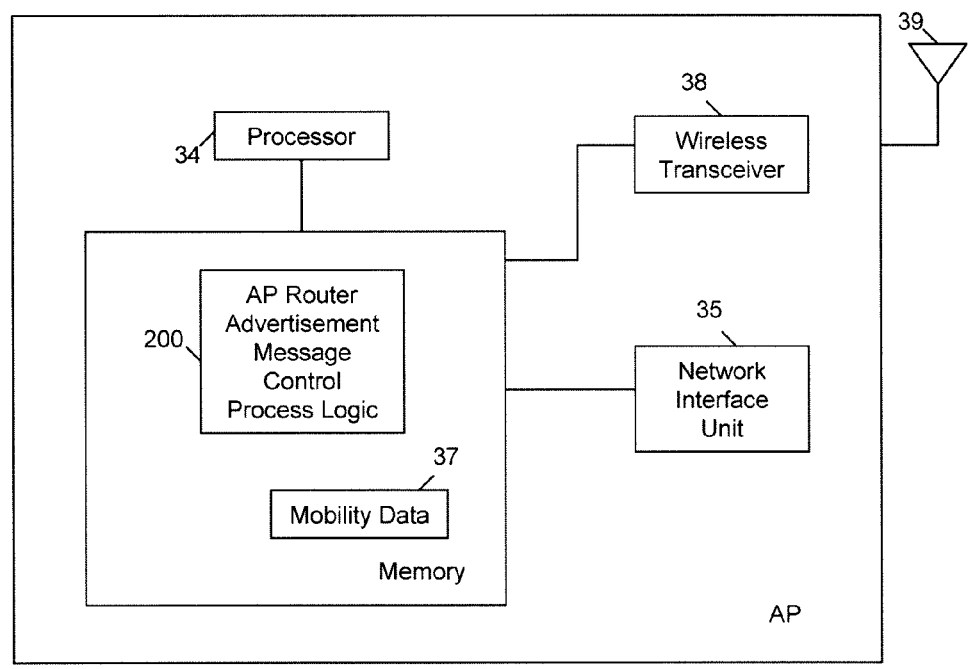
FIG. 3 is a block diagram for a wireless access point device configured to perform various router advertisement message routing control techniques.

FIG. 3 shows an example of a block diagram for an AP, such as APs 30(1)-30(N), 32(1)-32(M) and 33(1)-33(K). An AP comprises a processor 34, a wired network interface 35 and memory 36. In addition, an AP comprises a wireless transceiver 38 that is configured to transmit wireless signals to CDs and receive wireless signals from CDs via at least one antenna 39. The memory 36 stores mobility data 37 similar to the mobility data stored in a controller. The memory 36 also stores instructions for AP router advertisement message control process logic 200. The process logic 200 is described hereinafter in connection with FIGS. 5 and 8.

Figure 4:
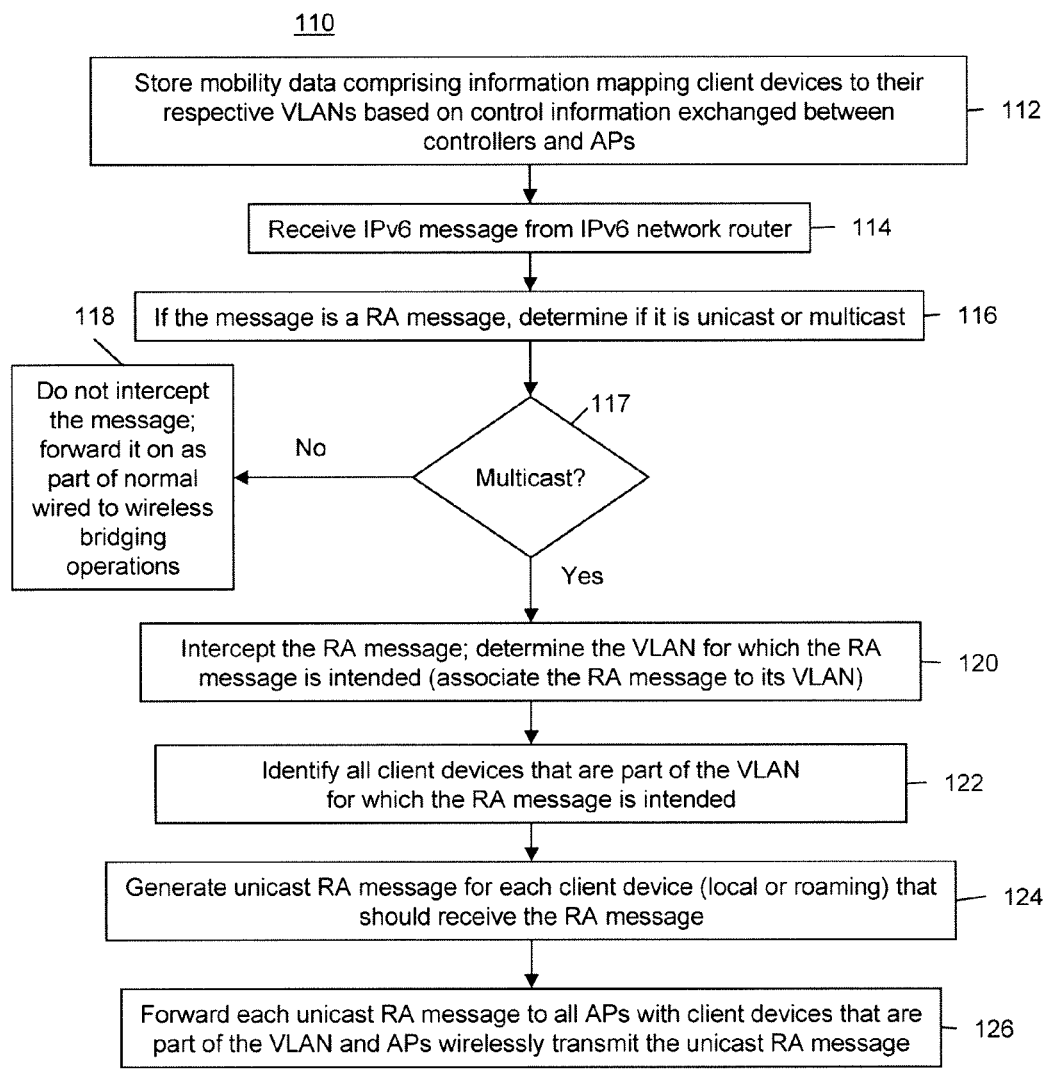
FIG. 4 is a flow chart depicting a router advertisement message routing control process performed in a controller to convert a multicast router advertisement message to a unicast router advertisement message for routing to individual wireless mobile client devices.
Figure 5:
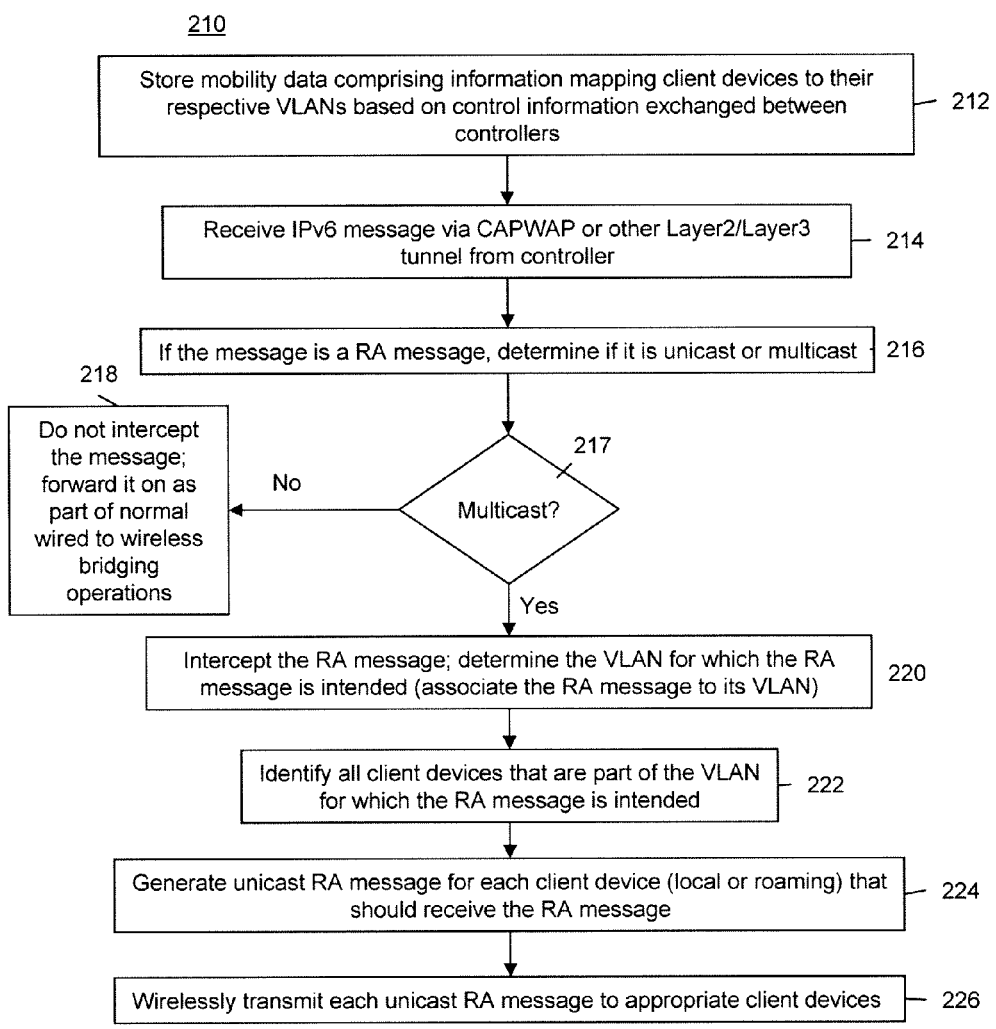
FIG. 5 is a flow chart depicting a router advertisement message routing control process performed in a wireless access point to convert a multicast router advertisement message to a unicast router advertisement message for routing to individual wireless mobile client devices.

Turning now to FIGS. 4 and 5, one aspect of RA message management is described to accommodate the mobility of CDs due to their capability of roaming from one AP to another AP through wireless connectivity. FIG. 4 illustrates a flow chart for one function of the process logic 100 that runs in a controller and FIG. 5 illustrates a flow chart for one function of the process logic 200 that runs on the AP. The flow charts of FIGS. 4 and 5 illustrate similar functions, but performed in different devices. This function pertains to the ability of a controller or an AP to segregate IPv6 prefixes on otherwise shared links and projecting prefixes to the CDs based on their respective VLANs. This makes the shared link appear as a collection of point-to-point links.

Thus, the flow chart in FIG. 4 depicts controller-based RA message handling function 110, e.g., a function performed at any one of the controllers 20(1)-20(3). At 112, the controller stores mobility data comprising information, perhaps in table form, that maps CDs to their respective VLANs and current attachment statement of a CD to a foreign controller, etc., as explained above. This information is obtained through exchanges of control information with other controllers and APs via a suitable tunnel, e.g., a CAPWAP tunnel. Thus, the storing function 112 is performed on a continuous basis to update information according to changing locations of CDs. In addition, each controller stores AP ID data, as described above in connection with FIG. 3, to identify APs that are under its control. At 114, the controller receives an IPv6 message from its IPv6 network router. For example, controller 20(1) receives an IPv6 message from router 10(1). At 116, when the message is determined to be an RA message, then the controller determines whether it is a unicast message or a multicast message. For example, the controller examines the layer-2 and layer-3 header information of the message to determine whether it is sent to a unicast address or a multicast address. Thus, the decision block 117 reflects the outcome of this determination. When it is determined that the RA message is a unicast RA message, then at 118, the RA message is not intercepted. Rather, the controller forwards it on to its unicast destination (ultimately to a CD via an AP) as part of normal wired to wireless bridging operations.

On the other hand, when it is determined that the RA message is a multicast message, the process proceeds to 120. At 120, the controller determines the particular VLAN for which the RA message is intended. In other words, the controller associates the RA message to the VLAN for which it is intended. This can be achieved in several ways. One technique is by examining a header of the message to obtain a "VLAN tag" for the RA message. The VLAN tag indicates the VLAN to which the message is intended. A second technique is to determine a configuration associated with the RA message, such as the port of the device from which the RA message was received. Some ports are dedicated or assigned to only certain VLANs (IPv6 subnets/prefixes). Configuration data is stored to indicate which VLANs are assigned to which ports. Thus, by determining the port configuration of the RA message, the intended target VLAN for the RA message can be determined.

At 122, the controller identifies all CDs that are part of the VLAN to which the RA message is intended based on the stored mobility data. Depending on the VLAN intended by the RA message, the CDs may be those that are local or home to the controller, that is, they are currently attached to an AP under control of the controller that is associated with the VLAN to which the RA message is intended. Alternatively, the CDs that are part of the VLAN for the RA message may be roaming from an AP under control of another controller. That is, the controller knows which, if any, local CDs or roaming CDs should be receiving the multicast RA message that the controller received at 116. At 124, the controller generates a unicast RA message for each of the CDs (local or roaming) that the controller determines that should receive the RA message. The RA message needs to be generated for all the CDs that are part of the VLAN to which the multicast RA message is intended. The unicast RA message is generated from the multicast RA message by replacing in the layer-2 header of the RA message, the multicast destination address with the media access control (MAC) address of the CD to which the RA message is to be sent. At 126, the controller forwards each RA unicast message to all APs under its control and the APs wireless transmit each unicast RA message to the appropriate CDs. Thus, the controller forwards the RA messages to all APs where there are visiting CDs that are part of the VLAN for which the multicast RA message is intended. As explained above in connection with FIG. 3, each controller stores AP ID data indicating the APs that are under its control. Thus, each CD will be sent a specifically addressed unicast RA message from the controller and the multicast RA message will not be sent out across the wireless link, thereby avoiding the flood of RA messages on the wireless link.

Turning now to FIG. 5, a flow chart is described for a function 210 that is similar to that of function 110 performed in a controller, but function 210 is performed in an AP. At 212, the AP stores mobility data similar to the function 112 described above in connection with FIG. 4. At 214, the AP receives an IPv6 message via the CAPWAP or other layer2/layer3 tunnel from its controller. At 216, the AP determines whether the message is an RA message and if so, determines whether it is a unicast message or a multicast message. The AP may make the unicast vs. multicast determination by examining the layer-2 and layer-3 header information of the RA message, as explained above. The decision block 217 represents the direction of the logic as the outcome of this determination. At 222, the AP identifies all CDs that are part of the VLAN for which the RA message is intended. The functions 218, 220, 222 and 224 are essentially the same as functions 118, 120, 122 and 124, respectively, described above in connection with FIG. 4 to ultimately create unicast copies of the multicast RA message for each CD that is part of the VLAN that is the target of the RA message. However, at 226, the AP wirelessly transmits each unicast RA message to each visiting CD.

In one embodiment, a subset of the storing mobility data, receiving RA messages, determining the VLAN for a received RA message, intercepting the RA message and generating the unicast RA message are performed at each controller 20(1)-20(3) and another subset of these functions is performed at each AP. For example, each controller 20(1)-20(3) is configured to store the mobility data, receive RA messages, determine the target VLAN of a received RA message and intercept the RA message, and forward the RA message to the AP whereas the intelligence and capability to convert a multicast RA message to a unicast RA message is provided at each AP.

As an example of the scenario described above in connection with FIGS. 4 and 5, reference is made again to FIG. 1. In this example, it is assumed that CDs 40(5) and 40(6) enter the mobility domain by attaching to one of the APs 34(1)-34(K) associated with controller 20(3). Thus, CDs 40(5) and 40(6) belong to the third VLAN. However, CD 40(6) roams from AP 34(K) to AP 30(1) that is controlled by controller 20(1). All of the controllers store information indicating an association of CDs to their respective VLANs on the basis of which of a plurality of APs the CD connects to initially (entering the mobility domain) and is assigned a network address. Controller 20(1) receives an RA message sent by its network router 10(1). Controller 20(1) determines whether the RA message is a multicast message, and if so, intercepts it. The controller 20(1) determines the VLAN to which the RA message is intended by examining the VLAN tag for the RA message or from port configuration associated with the message. The controller 20(1) then determines whether there is at least one CD currently connected to one of its APs that has belongs to the VLAN for which the RA message is intended. For example, the controller 20(1) receives a RA message with an IPv6 prefix indicating that it is intended for the third VLAN which is the VLAN for CD 40(6). Controller 20(1) determines that CD 40(6) is currently associated to one of its APs. Then, controller 20(1) generates a unicast RA message (using the MAC address for CD 40(6)) to be sent to the CD 40(6) via each of the APs 30(1)-30(N) operating in the first VLAN, or just via AP 30(1). If there are other CDs connected to any of the APs 30(1)-30(N) and whose VLAN is the third VLAN, then the controller 20(1) would generate separate unicast RA message for each of these CDs. As explained above in connection with FIG. 5, these same functions can be performed by an AP rather than by a controller. Thus, in this example, an AP would perform the aforementioned functions that are described above as being performed by the controller 20(1).

The following summarizes the overall functional flow of FIGS. 4 and 5. Information is stored (at an AP or a controller or other similar network element) indicating an association of wireless mobile client devices to their respective VLANs on the basis of which of a plurality of wireless access point devices a wireless mobile client device (initially) connects to and is assigned a network address. A router advertisement message sent by a network router device is received and it is determined whether the router advertisement message is a multicast message. When it is determined that the router advertisement message is a multicast message, it is intercepted. It is then determined which of the plurality of VLANs to which the router advertisement message is intended. A unicast router advertisement messages is generated to be sent to a local or roaming wireless mobile client device that is part of the VLAN for which the received router advertisement message is determined to be intended. Again, these functions may be performed by a controller that controls the APs in the particular VLAN or by any AP in the particular VLAN.

Figure 6:
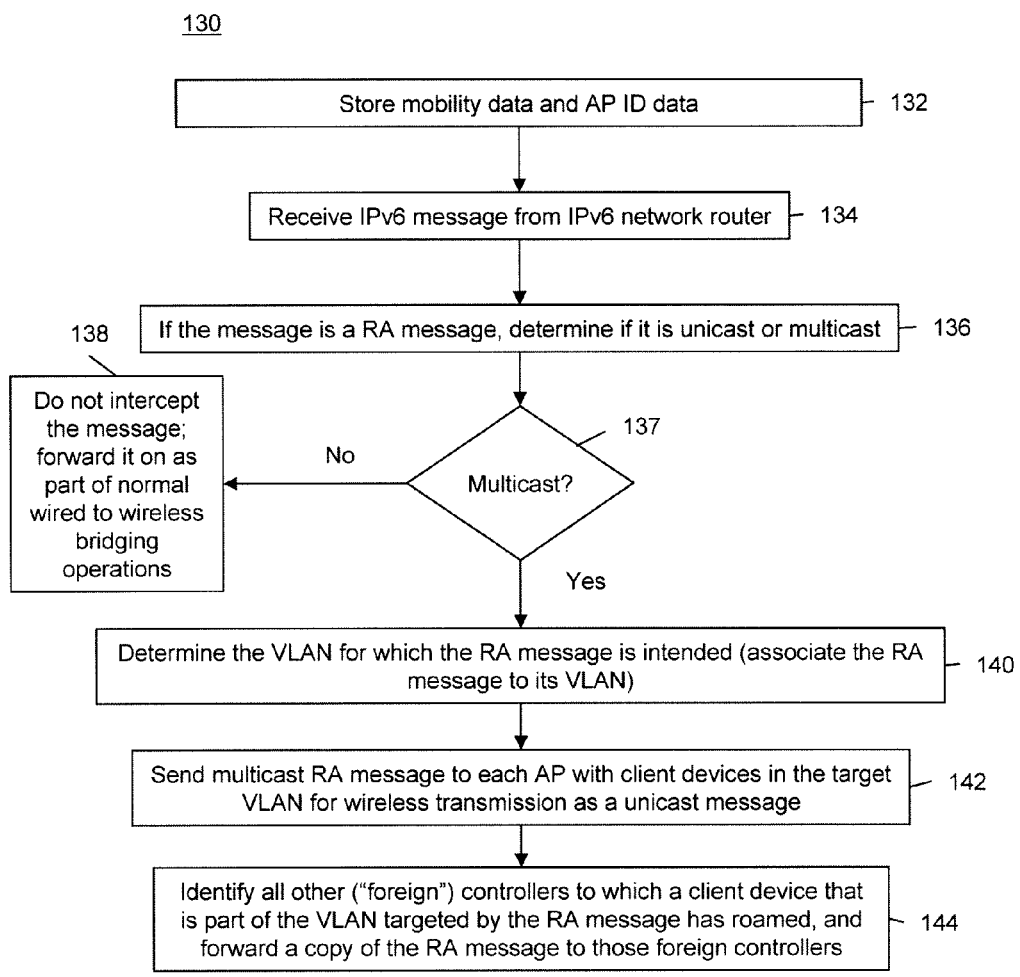
FIG. 6 is a flow chart depicting a router advertisement message routing control process performed in a controller to route multicast router advertisement messages to the appropriate controller that controls a wireless access point to which a wireless mobile client devices associated with the intended virtual local area network for the router advertisement message has roamed.

Turning now to FIG. 6, a flow chart is shown for a process 130 that is performed by a controller to handle periodic and non-periodic RA messages for local CDs and roaming CDs. At 132, the controller stores mobility data and AP ID data for APs under its control. Thus, the controller has information identifying other controllers that controls APs that serve other VLANs to which at least one client device from its associated VLAN has roamed.

At 134, the controller receives an IPv6 message from its IPv6 network router. At 136, the controller determines whether it is an RA message, and if so, whether it is a unicast RA message or a multicast RA message. The decision block 137 directs the processing flow to function 138 when the RA message is determined to be a unicast RA message. A unicast RA message is not intercepted, and instead is forwarded on as part of normal wired to wireless bridging operations. When the RA message is determined to be a multicast RA message, then at 140, the controller determines the VLAN for which the RA message is intended, again by examining the VLAN tag field or determining a port configuration of the RA message.

At 142, to forward the RA message to the CDs (whose VLAN is the target of the RA message) that are connected to an AP controlled by the controller, the controller sends the RA message, via the CAPWAP tunnel, to each AP with CDs in the target VLAN for wireless transmission as a unicast message to those CDs. The AP that receives the RA message converts it to a unicast message directed to the CD that is to receive that RA message, using the multicast to unicast conversion technique described above in connection with FIG. 4. At 144, to forward the RA message to CDs that have roamed to APs controlled by other ("foreign") controllers, the controller identifies all the foreign controllers that control the APs to which the CDs which are part of the VLAN targeted by the RA message have roamed. The controller has the information in its stored mobility data. The controller then forwards a copy of the RA message to each of the foreign controllers that controls an AP to which a CD (whose VLAN is the target of the RA message) has roamed.

An example is described of the process flow of FIG. 6 with reference to FIG. 1. In this example, the incoming RA message is received at the second controller 20(2) and the RA message includes an IPv6 prefix to indicate it is intended for the second VLAN. (The RA message could be intended for the first VLAN or second VLAN just as well.) Moreover, the second VLAN is the VLAN for CDs 40(3) and 40(4); however, CD 40(3) has roamed to the AP 30(N) whereas CD 40(4) has not roamed and is currently connected to AP 32(M). The controller 20(2) determines that the RA message is intended for the second VLAN and, based on its stored mobility data, knows that CD 40(3) has roamed to AP 30(N) under control of controller 20(1) and that CD 40(4) is still operating locally. Therefore, the controller 20(2) sends the RA message to its APs 32(1)-32(M)) or just to AP 32(M), via a CAPWAP or other tunnel, for wireless transmission as a unicast message to and ultimate reception by the CD 40(4). In addition, the controller 20(2) forwards a copy of the multicast RA message to controller 20(1), via a CAPWAP or other tunnel, for ultimate transmission by APs 30(1)-30(N) so that the RA message is received by the CD 40(3). Note that the controller 20(2) did not convert the multicast message to a unicast message.

The following summarizes the process flow of FIG. 6. At a controller configured to control one or more wireless access point devices that serve CDs that are part of a first VLAN, information is stored that identifies any other controllers that control other APs to at least one of which at least one wireless mobile client device that is part of the first VLAN has roamed. An RA message sent by a network router device is received at the controller. When it is determined that the RA message is a multicast message, the VLAN for the RA message is intended is determined. The RA message is sent to each of the one or more APs (controlled by the controller) for wireless transmission as a unicast message to a CD that is part of the first VLAN that is connected to one of the APs when it is determined that the RA message is intended the first VLAN. In addition, a copy of the multicast RA message is forwarded to all other controllers that control APs to which at least one CD that is part of the first VLAN has roamed.

Figure 7:
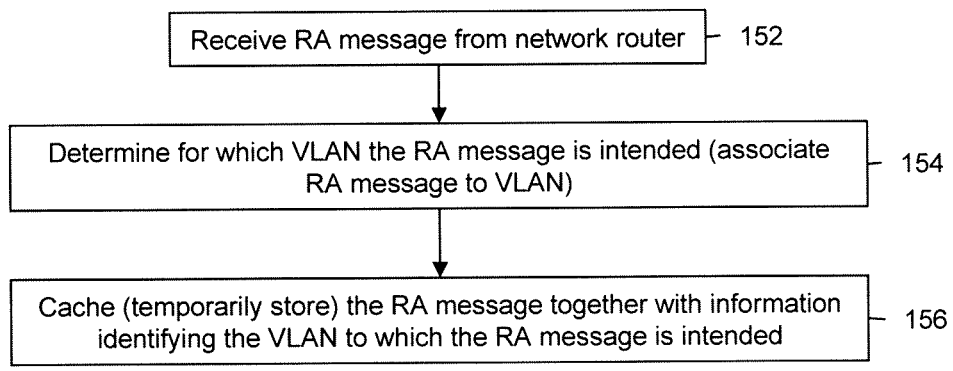
FIG. 7 is a flow chart for a process to cache router advertisement messages in a controller.
Figure 8:
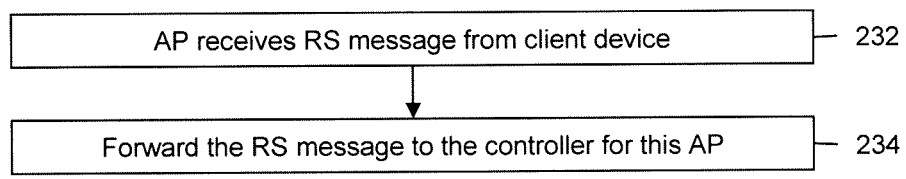
FIG. 8 is a flow chart for a process to forward router solicitation messages from a wireless access point to its associated controller.
Figure 9:
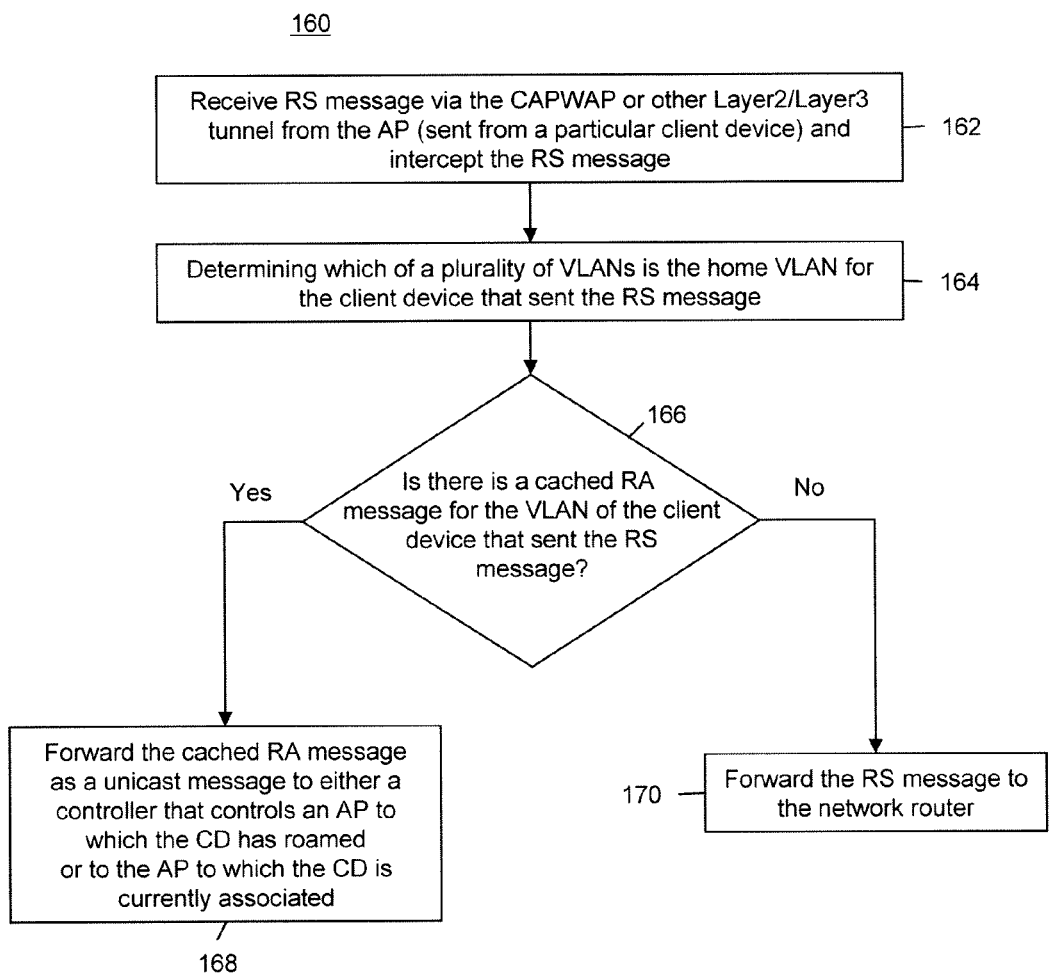
FIG. 9 is a flow chart for a process to retrieve and forward cached router advertisement messages to a wireless mobile client device in response to receiving a router solicitation message.

FIGS. 7-9 illustrate flow charts associated with techniques to intercept RS messages and respond with a unicast proxy response for ensuring each mobility event in a mobility domain is not resulting in a RA multicast "storm". FIG. 7 illustrates a flow chart for an RA message caching process 150 that is performed by a controller. At 152, the controller receives an RA message from the network router. At 154, the controller determines for which VLAN the RA message is intended. At 156, the controller caches (temporarily stores) the RA message together with information identifying the VLAN to which the RA message is intended.

FIG. 8 illustrates a flow chart for a process 230 that is performed at an AP with respect to RS messages. At 232, an AP receives an RS message from a CD. At 234, the AP forwards the RS message to the controller that controls the AP.

Turning now to FIG. 9, a flow chart is described for a process 160 that is performed at a controller to expedite handling of RS messages. At 162, the controller receives an RS message via the CAPWAP or other Layer2/Layer3 tunnel from the AP. The controller intercepts the RS message. At 164, the controller determines which of the plurality of VLANs is the VLAN for the CD that sent the RS message. That is, the controller identifies the VLAN to which the sending CD belongs. At 166, the controller determines if there is a cached RA message for the VLAN of the CD that sent the RS message. If so, then at 168, the controller sends the cached RA message as a unicast RA message to either the another controller that is configured to control at least one AP to which the CD has roamed, or to the AP to which the CD is currently associated if the CD is still operating locally. If there is no cached RA message for that VLAN, then at 170 the controller forwards it to its associated network router for handling. In this way, the controller serves as a proxy RA agent and can forward cache RA messages as unicast message at its own frequency.

In addition, the stored or cached RA message may originate from another controller that controls APs to which a CD has roamed.

As an example of the process flow described in connection with FIGS. 7-9, reference is again made to FIG. 1. Consider the situation where the controller 20(3) receives an RA message and determines that it is intended for the first VLAN. The controller 20(3) caches this RA message together with information indicating that the RA message is intended for the first VLAN. At some time later, the controller 20(3) receives an RS message forwarded to it from one of its AP 34(1)-34(K). For example, the RS message may be sent from CD 40(1) that belongs to the first VLAN. The controller 20(3) determines that the RS message is from a CD that belongs to the first VLAN. Then the controller 20(3) determines whether it has a cached RA message for the first VLAN. In this example, the controller 20(3) determines that it has a cached RA message for the first VLAN, converts it to a unicast message (as explained above in connection with FIGS. 4 and 5) and sends it to the appropriate AP for transmission to the CD 40(1). If the CD that sent the RS message is not currently operating in the third VLAN, then the controller 20(3) would send the unicast RA message to the controller associated with the VLAN in which that CD is currently operating. If the controller 20(3) determines that it does not have a cached RA message for the VLAN corresponding to the home VLAN of the CD that sent the RS message, then the controller 20(3) would forward that RS message to controller 20(1) and then to its network router 10(1).

The following summarizes the process flow described herein in connection with FIGS. 7-9. At a controller configured to control one or more wireless access point devices that serve wireless mobile client devices that are part of a first virtual local area network, a router advertisement message is received from a network router. It is determined for which of a plurality of virtual local area networks the router advertisement message is intended. The router advertisement message is stored together with information identifying the virtual local area network to which the router advertisement message is intended. A router solicitation message is received from a wireless access point device that was sent by a particular wireless mobile client device that is part of the first virtual local area network. It is determined to which of the plurality of virtual local area networks the particular wireless mobile client device belongs. It is then determined whether there is a router advertisement message stored for the virtual local area network to which the particular wireless mobile client device belongs. When there is a router advertisement message stored for the virtual local area network to which the particular wireless mobile client device belongs, the stored router advertisement message is retrieved and it is sent as a unicast message to the one or more wireless access point devices configured to serve wireless mobile client devices that are part of the first virtual local area network if the wireless mobile client device is attached to a wireless access point device controlled by the controller, or to another controller that is configured to control at least one wireless access point devices to which the wireless mobile client device has roamed.

Figure 10:
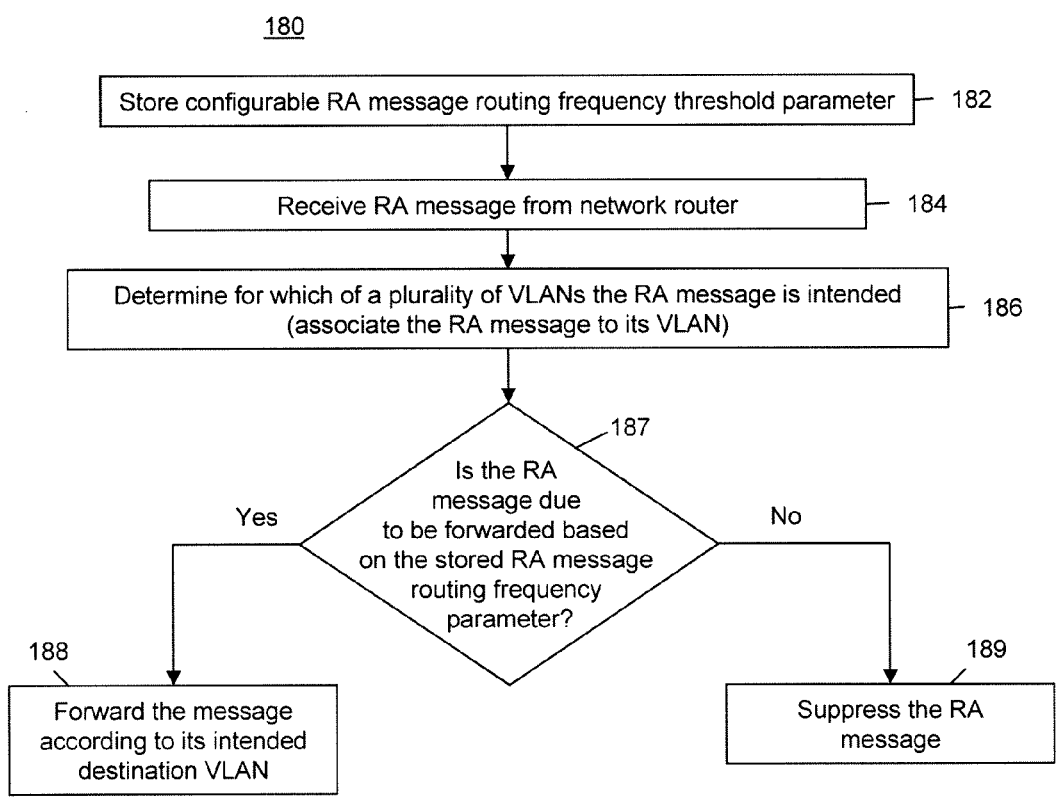
FIG. 10 is a flow chart for a process in a controller to control the frequency at which router advertisement messages are forwarded.

Turning now to FIG. 10, a flow chart for an RA message throttling process 180 is described. The process 180 is useful to allow a controller to apply a configurable frequency limit to the forwarding of RA messages to ensure that the WLAN links are not overwhelmed with high frequency RA message traffic. At 182, the controller stores a configurable RA message routing frequency threshold parameter that specifies a frequency at which the controller forwards router advertisement messages. This frequency threshold parameter is set by a network administrator and serves as a threshold that is used to determine when to forward an RA message to APs for wireless transmission to a CD. For example, this threshold represents a minimum period of time that needs to elapse between forwarding of successive RA messages for wireless transmission. At 184, the controller receives an RA message from its associated network router. At 186, the control determines for which of the plurality of VLANs the RA message is intended. At 187, the controller determines whether the RA message is due to be forwarded based on the stored RA message routing frequency parameter and the time that latest RA message was forwarded by the controller. When the controller determines that the RA message is due to be sent, then at 188, the controller forwards the message according to its intended destination VLAN. On the other hand, when the controller determines that the RA message is not due to be sent, then the controller suppresses the RA message and does not send. Consequently, that RA message will not be forwarded on. The next RA message destined for that VLAN may be forwarded on if it arrives at a time that satisfies the routing frequency threshold with respect to a previously forwarded RA message. Thus, the process 180 allows a controller to send RA messages at its own frequency regardless or independent of the frequency at which the network router sends messages to the controller. The network router may send RA messages more aggressively. For example, the network router may send RA messages every one minute, but the controller may be configured to suppress them and send them out only one every 10 minutes.

It is possible that a controller may store a different RA message routing frequency threshold parameter for each of the plurality of VLANs so that each RA message that is received at a given controller will be evaluated to the VLAN-specific frequency threshold parameter based on the intended VLAN for that RA message. This rate-limiting technique is also useful to minimize the amount of RA messages that need to be sent over the WLAN link to CDs, and it may be employed in connection with any of the RA message forwarding process flows described herein.

According to a further variation of the process shown in FIG. 10, a controller may be configured to store a list of one or more CDs from which RS messages have been received. When a RA message is received that is intended for a VLAN to which a particular CD in the stored list is associated, the controller generates a unicast RA message addressed to the particular CD and sends the unicast RA message to the particular CD without waiting for a next permitted RA message to be sent according to the RA frequency parameter. Thus, the timer associated with the RA frequency parameter is ignored and the RA message is immediately sent to a CD for which a RS message had been received by the controller (and which is included on the stored list of received RS messages at the controller).

Figure 11:
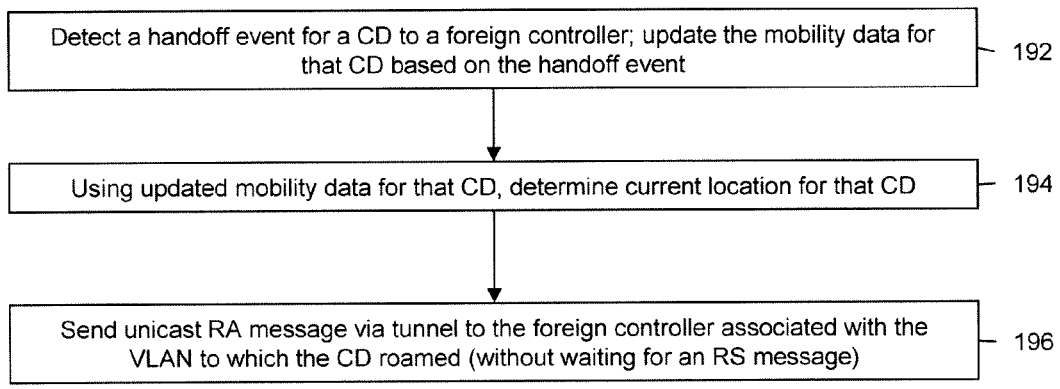
FIG. 11 is a flow chart for a process in a controller to send router advertisement messages in response to detecting handoff event and without waiting for a router solicitation message.

Reference is now made to FIG. 11 which shows a flow chart for a pro-active RA message forwarding process 190 that is performed a controller. The process 190 is useful to allow a controller to send unicast RA messages pro-actively upon receiving notification of a handoff of a CD whose home VLAN is controlled by that controller. This is useful to ensure low latency at handoff, avoiding the need to wait for RS messages from the roaming CD. For example, a handoff latency may be kept to less than 50 ms.

At 192, the controller detects a handoff event for a CD by detecting that the that is part of the VLAN served by the APs under control of the controller has roamed to an AP that is under control of another, i.e., foreign controller. The controller receives control messages via the CAPWAP tunnel with the foreign controller to receive notification of the handoff event for a given CD. In this way, the controller knows the ID for the controller to which the handoff of the CD occurred. Thus, the controller can update its mobility data for that CD based on the handoff notification. At 194, using the updated mobility data for the CD, the controller determines the current controller location for the CD. At 196, without waiting for an RS message from the CD or for the time for the next periodic RA message to be sent, the controller generates and sends a unicast RA message via a CAPWAP or other Layer2/Layer3 tunnel to the controller that controls the AP to which the CD roamed.

Thus, the following summarizes the process flow shown in FIG. 11. At a first controller configured to control one or more wireless access point devices configured to serve wireless mobile client devices that are part of a first VLAN, detecting that a particular wireless mobile client device that belongs to the first VLAN has roamed to an AP under control of a second controller. In response to detecting the roaming event, the first controller sends to the second controller a unicast router advertisement message intended for the particular wireless mobile client device without waiting for a router solicitation message from the particular wireless mobile client device. Whenever a CD roams from one AP to another AP, a controller generates a mobility event and some context information is transferred from the home AP or controller to the foreign AP or controller. The CD attaches to a new AP. The home controller detects this handoff and generates an RA message that it sends to that CD, via the AP where the CD attached. The RA message is typically generated at a periodic frequency, or in response to an RS message. However, according to the techniques of FIG. 11, the RA message is generated and sent without waiting for the RS message from the client. This reduces handoff latency.

The router advertisement message routing techniques described herein allow for efficient routing of the messages to support IPv6 mobility support in WLAN controller systems. FIGS. 4-6 illustrate techniques whereby RA messages are segregated based on IPv6 prefix information. Those techniques prevent a "storm" of RA multicast messages that would otherwise occur if a wireless mobile client device, after performing a layer-2 or layer-3, roaming detect a new link and will loses its previous prefixes/addresses associated with the home VLAN where it initially entered the mobility domain.

Although the techniques are illustrated and described herein as embodied in one or more specific examples, it is nevertheless not intended to be limited to the details shown, since various modifications and structural changes may be made therein without departing from the scope of the and range of equivalents of the claims.

What is claimed is:

1. A method comprising:
   storing information indicating an association of wireless mobile client devices to their respective virtual local area networks;
   receiving a router advertisement message sent by a network router device;
   determining whether the router advertisement message is a multicast message;
   when it is determined that the router advertisement message is a multicast message, intercepting the router advertisement message and determining which of a plurality of virtual local area networks to which the router advertisement message is intended;
   generating a unicast router advertisement message to be sent to a local or roaming wireless mobile client device that is part of the virtual local area network for which the received router advertisement message is determined to be intended, wherein generating the unicast router advertisement message comprises changing a header field of the router advertisement message to replace a multicast destination address in the router advertisement message with a media access control address for the wireless mobile client device that is part of the virtual local area network for which the router advertisement message was intended; and
   suppressing a router advertisement message received from the network router device so as not to forward it to any one or more of a plurality of wireless access point devices associated with a controller based on a stored router advertisement frequency parameter.

2. The method of claim 1, wherein determining which of the plurality of virtual local area networks to which the router advertisement message is intended comprises examining a field of the router advertisement message or determining a configuration associated with a port or the router advertisement message.

3. The method of claim 1, wherein determining comprises determining that the router advertisement message is sent to a unicast destination address corresponding to a particular wireless mobile client device, and if so, forwarding it for wireless transmission to the particular wireless mobile client device as part of normal wired to wireless bridging operations.

4. The method of claim 1, wherein a subset of said storing, receiving, determining, intercepting and generating functions are performed at a wireless access point device configured to serve wireless mobile client devices and a remaining subset of said storing, receiving, determining and intercepting functions are performed at a controller configured to control one or more wireless access point devices that serve wireless mobile client devices.

5. The method of claim 4, wherein said storing, receiving, determining and intercepting are performed at the controller and the generating the unicast router advertisement message is performed at the wireless access point device.

6. The method of claim 1, and further comprising determining whether a router advertisement message is due to be forwarded based on the stored router advertisement frequency parameter that specifies a frequency at which the controller forwards router advertisement messages independent of a frequency at which the network router sends router advertisement messages to the controller, and forwarding the router advertisement message.

7. The method of claim 1, and further comprising at the controller, storing a list of one or more wireless mobile client devices from which router solicitation messages have been received, and wherein upon receiving a router advertisement message intended for a virtual local area network to which a particular wireless mobile client device in the stored list is associated, generating a unicast router advertisement message addressed to the particular wireless mobile client device and sending the unicast router advertisement message to the particular wireless mobile client device without waiting for a next permitted router advertisement message according to the stored router advertisement frequency parameter.

8. An apparatus comprising:
a network interface unit configured to send and receive messages over a wired network;
a processor coupled to the network interface unit and configured to:
store information indicating an association of wireless mobile client devices to their respective virtual local area networks;
receive a router advertisement message sent by a network router device associated with the wired network;
determine whether the router advertisement message is a multicast message;
when it is determined that the router advertisement message is a multicast message, intercept the router advertisement message and determine which of a plurality of virtual local area networks to which the router advertisement message is intended;
generate a unicast router advertisement message to be sent to a local or roaming wireless mobile client device that is part of the virtual local area network for which the received router advertisement message is determined to be intended by changing a header field of the router advertisement message to replace a multicast destination address in the router advertisement message with a media access control address for the wireless mobile client device that is part of the virtual local area network for which the router advertisement message was intended; and
suppress a router advertisement message received from the network router device so as not to forward it to any one or more of a plurality of wireless access point devices associated with a controller based on a stored router advertisement frequency parameter.

9. The apparatus of claim 8, wherein the processor is configured to determine the virtual local area network for which the router advertisement message is intended by examining a field of the router advertisement message or by determining a configuration associated with a port or the router advertisement message.

10. The apparatus of claim 8, wherein the processor is configured to store a list of one or more wireless mobile client devices from which router solicitation messages have been received, and upon receiving a router advertisement message intended for a virtual local area network to which a particular wireless mobile client device in the stored list is associated, generate a unicast router advertisement message addressed to the particular wireless mobile client device and cause the unicast router advertisement message to be sent to the particular wireless mobile client device without waiting for a next permitted router advertisement message according to the stored router advertisement frequency parameter.

11. The apparatus of claim 8, wherein the processor is configured to determine that the router advertisement message is sent to a unicast destination address corresponding to a particular wireless mobile client device, and if so, forward it for wireless transmission to the particular wireless mobile client device as part of normal wired to wireless bridging operations.

12. The apparatus of claim 8, wherein the processor is further configured to determine whether a router advertisement message is due to be forwarded based on the stored router advertisement frequency parameter that specifies a frequency at which the controller forwards router advertisement messages independent of a frequency at which the network router sends router advertisement messages to the controller, and forward the router advertisement message.

13. A non-transitory processor readable medium storing instructions that, when executed by a processor, cause the processor to:
store information indicating an association of wireless mobile client devices to their respective virtual local area networks;
receive a router advertisement message sent by a network router device associated with a wired network;
determine whether the router advertisement message is a multicast message;
when it is determined that the router advertisement message is a multicast message, intercept the router advertisement message and determine which of a plurality of virtual local area networks to which the router advertisement message is intended;
generate a unicast router advertisement message to be sent to a local or roaming wireless mobile client device that is part of the virtual local area network for which the received router advertisement message is determined to be intended by changing a header field of the router advertisement message to replace a multicast destination address in the router advertisement message with a media access control address for the wireless mobile client device that is part of the virtual local area network for which the router advertisement message was intended; and
suppress a router advertisement message received from the network router device so as not to forward it to any one or more of a plurality of wireless access point devices associated with a controller based on a stored router advertisement frequency parameter.

14. The processor readable medium of claim 13, further comprising instructions operable to store a list of one or more wireless mobile client devices from which router solicitation messages have been received, and upon receiving a router advertisement message intended for a virtual local area network to which a particular wireless mobile client device in the stored list is associated, generate a unicast router advertisement message addressed to the particular wireless mobile client device and cause the unicast router advertisement message to be sent to the particular wireless mobile client device without waiting for a next permitted router advertisement message according to the stored router advertisement frequency parameter.

15. The processor readable medium of claim 13, further comprising instructions operable to determine that the router advertisement message is sent to a unicast destination address corresponding to a particular wireless mobile client device, and if so, forward it for wireless transmission to the particular wireless mobile client device as part of normal wired to wireless bridging operations.

16. The processor readable medium of claim 13, further comprising instructions operable to determine whether a router advertisement message is due to be forwarded based on the stored router advertisement frequency parameter that specifies a frequency at which the controller forwards router advertisement messages independent of a frequency at which the network router sends router advertisement messages to the controller, and forward the router advertisement message.

17. The processor readable medium of claim 13, further comprising instructions operable to determine which of the plurality of virtual local area networks to which the router advertisement message is intended comprises instructions operable to examine a field of the router advertisement message or determine a configuration associated with a port or the router advertisement message.

* * * * *